United States Patent
Morishita (10) Patent No.: US 7,503,677 B2
(45) Date of Patent: Mar. 17, 2009

(54) HEADLIGHT CONTROL APPARATUS AND METHOD FOR VEHICLE

(75) Inventor: Masahiko Morishita, Toyoake (JP)

(73) Assignee: DENSO Corporation, Kariya (JP)

( * ) Notice: Subject to any disclaimer, the term of this patent is extended or adjusted under 35 U.S.C. 154(b) by 152 days.

(21) Appl. No.: 11/485,412

(22) Filed: Jul. 13, 2006

(65) Prior Publication Data
US 2007/0024200 A1   Feb. 1, 2007

(30) Foreign Application Priority Data
Jul. 28, 2005   (JP) ............... 2005-218762

(51) Int. Cl.
*B60Q 1/00* (2006.01)
(52) U.S. Cl. .............. 362/466; 362/37; 362/319; 362/324; 362/464; 362/465
(58) Field of Classification Search ............... 362/37, 362/319, 324, 464–466
See application file for complete search history.

(56) References Cited

U.S. PATENT DOCUMENTS 5,562,336 A * 10/1996 Gotou .................. 362/466
6,049,749 A * 4/2000 Kobayashi ............ 701/49
6,343,869 B1 * 2/2002 Kobayashi ............ 362/37
6,752,508 B2    6/2004 Kobayashi

FOREIGN PATENT DOCUMENTS

JP    2002-225617    8/2002

* cited by examiner

*Primary Examiner*—Sandra L. O'Shea
*Assistant Examiner*—Meghan K. Dunwiddie
(74) *Attorney, Agent, or Firm*—Nixon & Vanderhye P.C.

(57) ABSTRACT

A headlight control apparatus and method controls an irradiation direction of a headlight. This apparatus uses a navigation-based swivel angle calculated based upon the shape of a road in a navigation-based control period, and a steering-based swivel angle calculated based upon a steering angle in a steering-based control period. When the control period changes from the navigation-based control period to the steering-based control period, this apparatus uses a value between the navigation-based swivel angle and the steering-based swivel angle as a present control swivel angle for controlling the irradiation direction of the headlight.

12 Claims, 6 Drawing Sheets

| TIME | K40 | TIME | K40 | TIME | K40 | TIME | K40 |
|---|---|---|---|---|---|---|---|
| 0.0000 | 0.010 | 0.0512 | 0.055 | 1.0240 | 0.103 | 1.5360 | 0.119 |
| 0.0512 | 0.016 | 0.5632 | 0.058 | 1.0752 | 0.106 | 1.5872 | 0.135 |
| 0.1024 | 0.025 | 0.6144 | 0.061 | 1.1264 | 0.107 | 1.6384 | 0.154 |
| 0.1536 | 0.037 | 0.6656 | 0.064 | 1.1776 | 0.108 | 1.6896 | 0.183 |
| 0.2048 | 0.039 | 0.7168 | 0.068 | 1.2288 | 0.109 | 1.7408 | 0.224 |
| 0.2560 | 0.041 | 0.7680 | 0.072 | 1.2800 | 0.110 | 1.7920 | 0.287 |
| 0.3072 | 0.043 | 0.8192 | 0.078 | 1.3312 | 0.111 | 1.8432 | 0.380 |
| 0.3584 | 0.046 | 0.8704 | 0.082 | 1.3824 | 0.112 | 1.8944 | 0.580 |
| 0.4096 | 0.049 | 0.9216 | 0.088 | 1.4336 | 0.113 | 1.9456 | 0.780 |
| 0.4608 | 0.052 | 0.9728 | 0.095 | 1.4848 | 0.114 | 1.9968 | 1.000 |

HEADLIGHT CONTROL APPARATUS AND METHOD FOR VEHICLE

CROSS REFERENCE TO RELATED APPLICATION

This application is based on Japanese Patent Application No. 2005-218762 filed on Jul. 28, 2005, the disclosure of which is incorporated herein by reference.

FIELD OF THE INVENTION

The present invention relates to a headlight control apparatus and method for a vehicle which calculates a direction in which a headlight irradiates a beam in a plurality of methods.

BACKGROUND OF THE INVENTION

A conventional leadlight control apparatus for a vehicle calculates a direction (i.e., control direction) in which a headlight is forced to irradiate a beam in a plurality of methods as disclosed in JP 2002-225617A, for example. This control apparatus properly switch a method of calculating a control direction of headlight irradiation based upon a steering angle of a driver and a method of calculating a control direction of headlight irradiation based upon the direction of a guide route by a navigation system for use.

However, at the time of switching the calculation methods for the control direction of headlight irradiation, a rapid change in the control direction possibly occurs. For example, a method of calculating the control direction in headlight irradiation based upon the direction of the guide route in the navigation system is switched to a method of calculating the control direction of headlight irradiation based upon a steering angle of a vehicle. This calculation method switching possibly results in that the control directions calculated by the two methods are different from each other at a moment when one of two methods to the other is switched, caused by that information of the navigation system in regard to the shape of a road ahead of a vehicle is not accurate or the like. Difference in control direction of headlight irradiation in the two methods possibly leads to a rapid change in the control direction at the time of the calculation method switching.

When the control direction thus rapidly changes at the time of switching the two control directions, the rapid change in irradiation direction of a headlight results in poor forward visibility of a driver.

SUMMARY OF THE INVENTION

The present invention therefore has an object of providing a headlight control apparatus and method for a vehicle which improves forward visibility of a driver at the time of direction calculation method switching.

According to an aspect of the present invention, the control direction in a transition control period of headlight irradiation at the time of switching from a first period to the transition control period is not changed immediately from a first irradiation direction to a second irradiation direction, but to an intermediate direction therebetween. Therefore, the degree of change in the control direction is restricted, resulting in reduction of degree in deterioration of forward visibility of a driver. Further, in the transition control period, new control directions are sequentially calculated as directions between the second irradiation direction and the past control direction. As a result, the control direction comes gradually closer to the second irradiation direction.

The difference between the first method and the second method means that the first method differs in a combination of the kind of data to be used and a calculation algorithm using the data from the second method. Accordingly, when the kind of data used in the first method is different from that of the second method, even if the calculation algorithm in the first method is the same as that in the second method, the first method is resultantly different from the second method. In addition, even if the kind of data used in the first method is the same as that of the second method, when the calculation algorithm in the first method is different from that in the second method, the first method is resultantly different from the second method.

BRIEF DESCRIPTION OF THE DRAWINGS

Other objects, features, and advantages of the present invention will become more apparent from the following detailed description made with reference to the accompanying drawings, in which like parts are designated by like reference numbers. In the drawings.

DETAILED DESCRIPTION OF THE PREFERRED EMBODIMENTS

Figure 1:
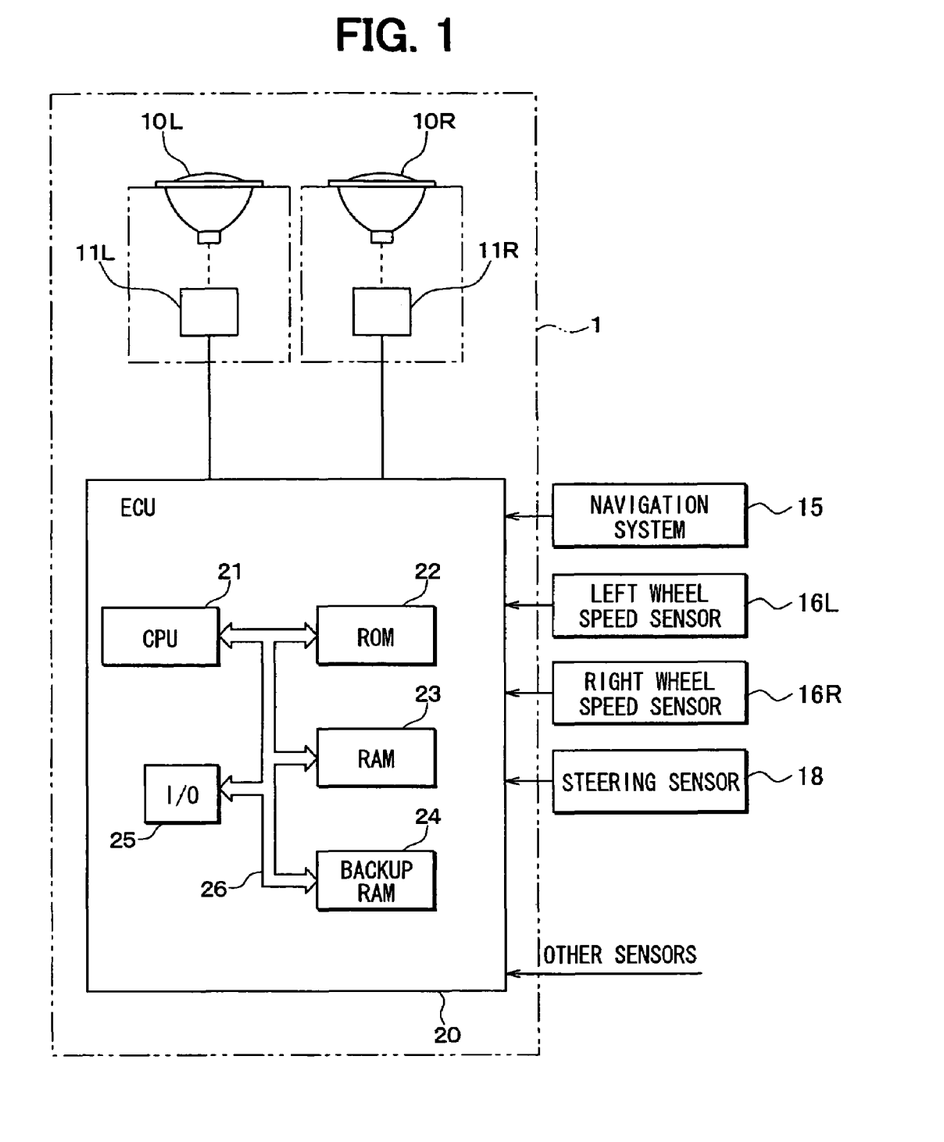
FIG. 1 is a block diagram showing a headlight control apparatus for a vehicle according to an embodiment of the present invention.

Referring to FIG. 1, right and left headlights 10R and 10L are located on a front end of a vehicle as headlights. The headlights 1OR and 10L each are connected to actuators 11R and 11L respectively for adjusting the light axis direction of each headlight 10R and 10L. An electronic control unit (ECU) is structured as a logic calculation circuit including a CPU 21 as a central processing device for executing known, various calculation processing, a ROM 22 for storing control programs and control data in mapped form, a RAM 23 for storing various data, a backup RAM 24, an input/output circuit 25, a bus line 26 and the like.

Various signals indicative of a vehicle travel condition are inputted to the ECU 20, such as an output signal from a known navigation system 15 mounted in the vehicle, an output signal from a left vehicle wheel speed sensor 16L for detecting a left vehicle wheel speed VL of a left vehicle wheel in the vehicle, an output signal from a right vehicle wheel speed sensor 16R for detecting a right vehicle wheel speed VR of a right vehicle wheel in the vehicle, and an output signal form a steering angle sensor 18 for detecting a steering angle STA of a steering wheel by a driver.

Further, the output signals from the ECU 20 are inputted to each of the actuators 11R and 11L of the right and left headlights 10R and 10L of the vehicle, so that a light axis direction (i.e., irradiation direction) of each of the right and left headlights 10R and 10L is adjusted.

Figure 2:
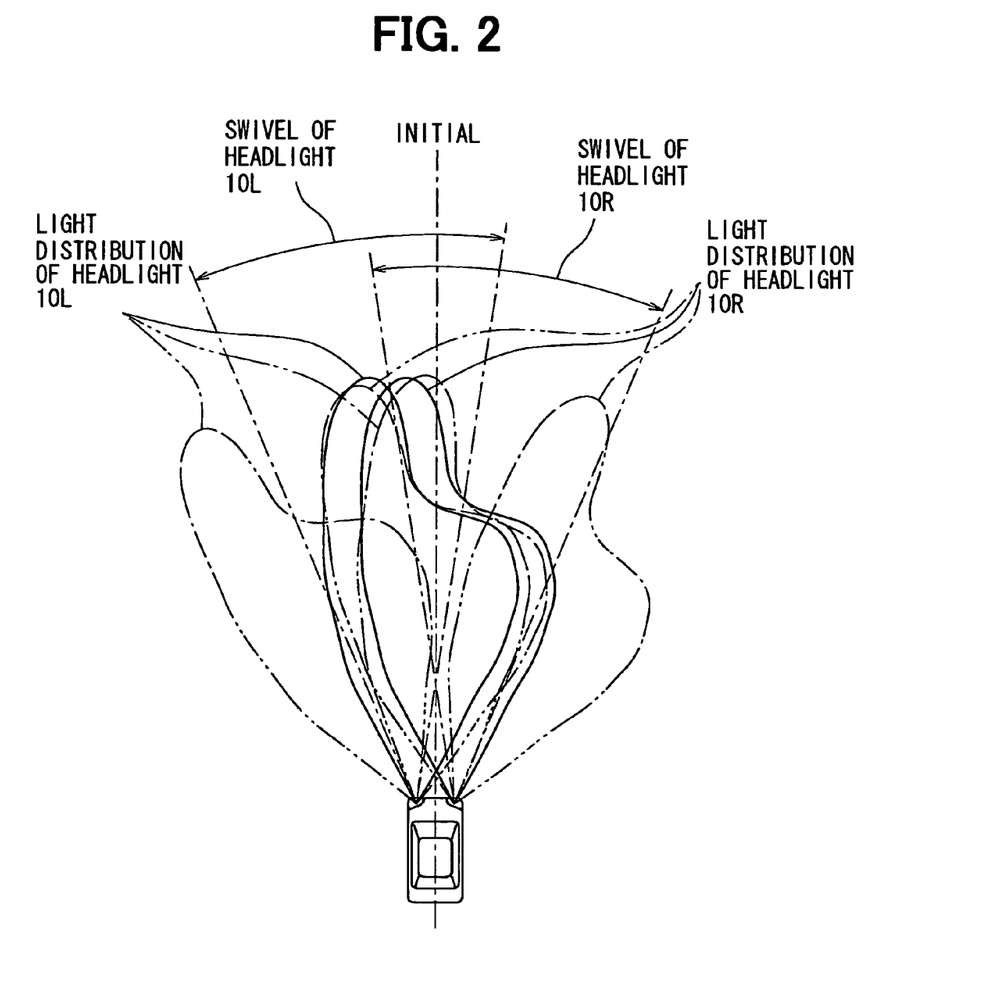
FIG. 2 is a pattern diagram showing a light distribution region of each of a right headlight and a left headlight.

As shown in FIG. 2, a light distribution region at the low beam of each headlight 10R and 10L is adjusted within a swivel control range from an initial position to the right or left direction in accordance with a steering degree of a steering wheel from a neutral point to the right direction or left direction. This swivel control range is set in consideration of visibility of the right or left direction in association with steering of the steering wheel by a driver without lowering forward visibility of the driver.

Therefore, in the right turning of the vehicle by steering the steering wheel in the vehicle, the swivel control range of the right headlight 10R in the right direction relative to the light distribution region of the right headlight 10R is wider than the swivel control range of the left headlight 10L in the right direction relative to the light distribution region of the left headlight 10L. On the contrary, in the left turning of the vehicle by steering the steering wheel in the vehicle, the swivel control range of the left headlight 10L in the left direction relative to the light distribution region of the left headlight 10L is wider than the swivel control range of the left headlight 10L in the left direction relative to the light distribution region of the right headlight 10R.

Figure 3:
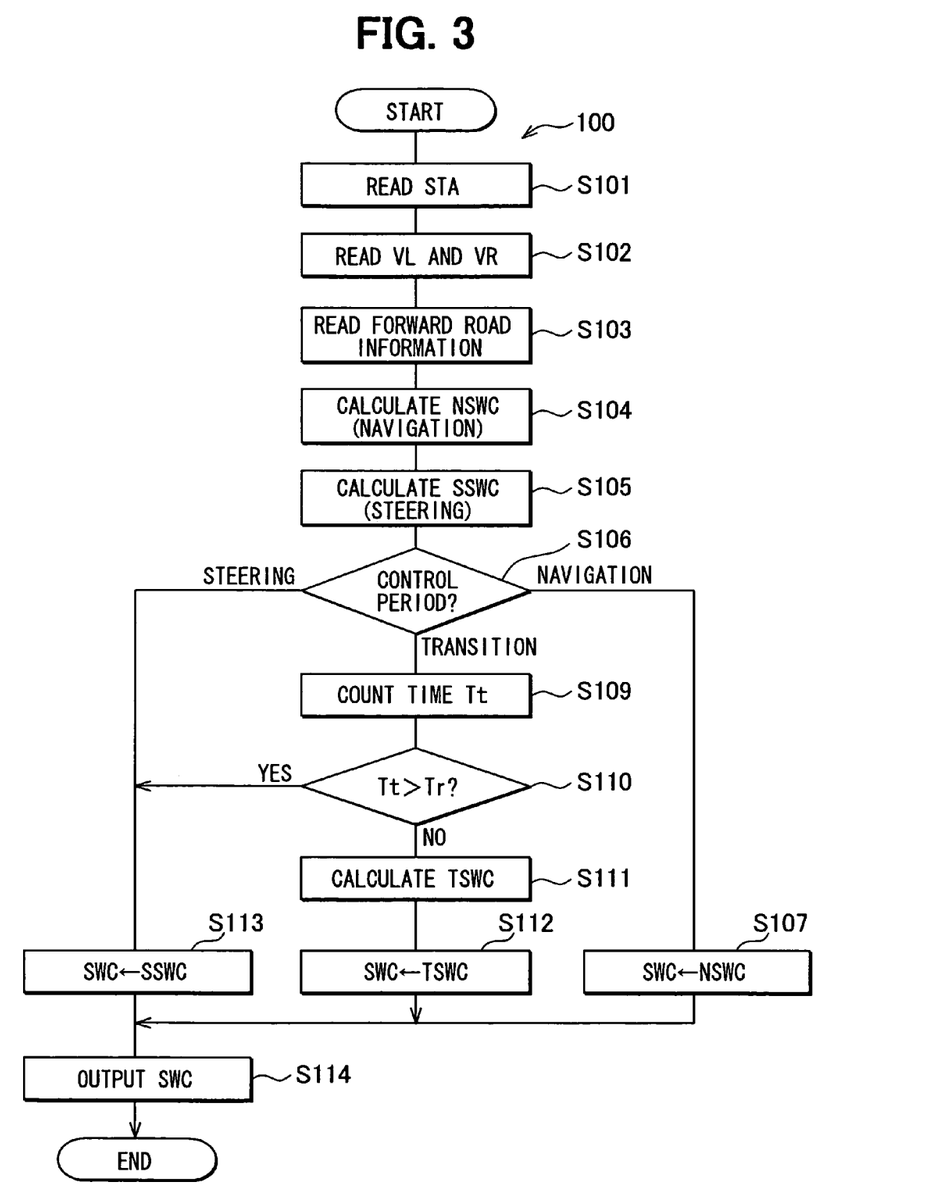
FIG. 3 is a flow chart showing a swivel angle calculation program executed in the embodiment.

Next, the CPU 21 is programmed to execute procedure of the swivel angle calculation program 100 repeatedly (for example, every 50 ms) as shown as a flow chart of FIG. 3.

In execution of the swivel control angle calculation program 100, first at step S101 a steering angle STA detected by the steering angle sensor 18 is read in the CPU 21. Next, the process proceeds to step S102, wherein a left vehicle wheel speed VL detected by the left vehicle wheel sensor 16L and a right vehicle wheel speed VR detected by the right vehicle wheel sensor 16R are read in the CPU 21. Then the process proceeds to step S103, wherein information of a road ahead of a vehicle is read in the CPU 21 from the navigation system 15.

Next, the process proceeds to step S104, wherein a navigation-based swivel angle NSWC is calculated in accordance with the vehicle speed V based upon the left vehicle wheel speed VL and the right vehicle wheel speed VR read at step S102 and information of a road ahead of the vehicle from the navigation system 15 read at step S103. The swivel angle NSWC may be referred to as a first irradiation direction, and this calculation may be referred to as a first method.

Next, the process proceeds to step S105, wherein a steering angle swivel angle SSWC is calculated in accordance with the steering angle STA read at step S101 and a vehicle speed V based upon the left vehicle wheel speed VL and the right vehicle wheel speed VR read at step S102. This angle SSWC may be referred to as a second irradiation direction, and this calculation may be referred to as a second method.

Then the process proceeds to step S106, wherein the control period determination is made as a control mode determination. In the control period determination, a determination is made based upon various conditions as to which one of a navigation-based control period (corresponding to a first period or mode), a steering-based control period (corresponding to a second period or mode) and a transition control period the present point belongs to.

The present point may be determined to belong to the navigation-based control period, for example, when no steering is determined based upon information from the steering angle sensor 18, that is, the steering angle STA read at step 101 does not exceed a dead zone of the neutral position and the vehicle is in the straight traveling state or when the curvature radius of a road ahead of the vehicle is determined to be less than a reference length (i.e., 200 m) based upon information of the road ahead of the vehicle read at step S103 or the like.

The present point may be determined to belong to the steering-based control period, for example, when it is determined that the present point does not belong to the navigation-based control period and the steering angle swivel angle SSWC calculated at step S105 is more than a value (the previous swivel angle) adopted as the control swivel angle SWC in execution of the previous swivel calculation angle program 100, that is, the steering angle catches up to the previous control swivel angle SWC or the like.

The present point may be determined to belong to the transition control period, for example, when it is determined that the present point does not belong to the navigation-based control period and the steering angle does not catch up to the previous control swivel angle SWC or the like.

In a case that the present point belongs to the navigation-based control period, subsequently the process proceeds to step S107. In a case that the present point belongs to the steering-based control period, subsequently the process proceeds to step S113. In a case that the present point belongs to the transition control period, subsequently the process proceeds to step S109.

At step S107, the navigation-based swivel angle NSWC calculated at step S104 is adopted as a value of the swivel control angle SWC. At step S113, the steering angle swivel angle SSWC calculated at step S105 is adopted as a value of the swivel control angle SWC.

At step S109, a time counter counts up, which counts time Tt in which the determination at step S106 that the present point belongs to the transition control period continuously lasts. Next, at step S110, it is determined whether or not a value Tt of the time counter exceeds a reference value Tr. This reference value Tr is a reference period representing the maximum length of the transition control period. This reference period may be a constant value (for example, 2 sec) stored in advance or a value changing with various conditions (for example, a vehicle speed, a user's setting, age of a driver registered or the like), or a value determined at random within a certain range. In a case in which the value Tt of the time counter exceeds the reference value Tr, the above step S113 is executed. In a case in which the value Tt of the time counter does not exceed the reference value Tr, next the step S111 is executed.

At step S111, a transition swivel angle TSWC (an example of a transition irradiation direction) is calculated as a value between the previous swivel angle and this time's steering angle swivel angle SSWC based upon the previous swivel angle, present steering angle swivel angle SSWC calculated at step S105 and an elapse time from a point when the navigation-based control period terminates. Next, at step S112, this calculated transition swivel angle TSWC is set as the control swivel angle SWC (control direction).

After step S107, step S112 or step S113 is executed, the process proceeds to step S114. At step S114, a control signal is outputted to the left actuator 11L and the right actuator 11R so that the control swivel angle SWC adopted at step S107, step S111 or step S113 is attained. After step S114, one cycle execution of the swivel control angle calculation program 110 ends.

The CPU 21 repeatedly executes the swivel control angle calculation program 100 as described above. Thereby, the headlight control apparatus for the vehicle 1 repeatedly calculates the navigation-based swivel angle NSWC based upon the forward road information and the vehicle wheel speeds (step S104) and repeatedly calculates the steering angle swivel angle SSWC based upon the steering angle, the vehicle speeds and the like (step S105).

In the navigation-based control period, the navigation-based swivel angle NSWC is repeatedly adopted as the control swivel angle SWC (step S107) and the light axis direction of each of the right and left headlights is controlled by using the adopted control swivel angle SWC (step S114).

In addition, for example, in the transition period after the navigation-based control period terminates caused by starting the steering, the transition swivel angle TSWC is repeatedly calculated as a value between the previous swivel angle and the steering angle swivel angle SSWC (step S111). The transition swivel angle TSWC is repeatedly adopted as the control swivel angle SWC (step S111 and S112), and the light axis direction of each of the right and left headlights is controlled by using the adopted control swivel angle SWC (step S114).

In addition, in the steering-based control period or the transition control period Tt exceeds the reference period Tr (step S110), the steering angle swivel angle SSWC is repeatedly adopted as the control swivel angle SWC (step S113).

Figure 4:
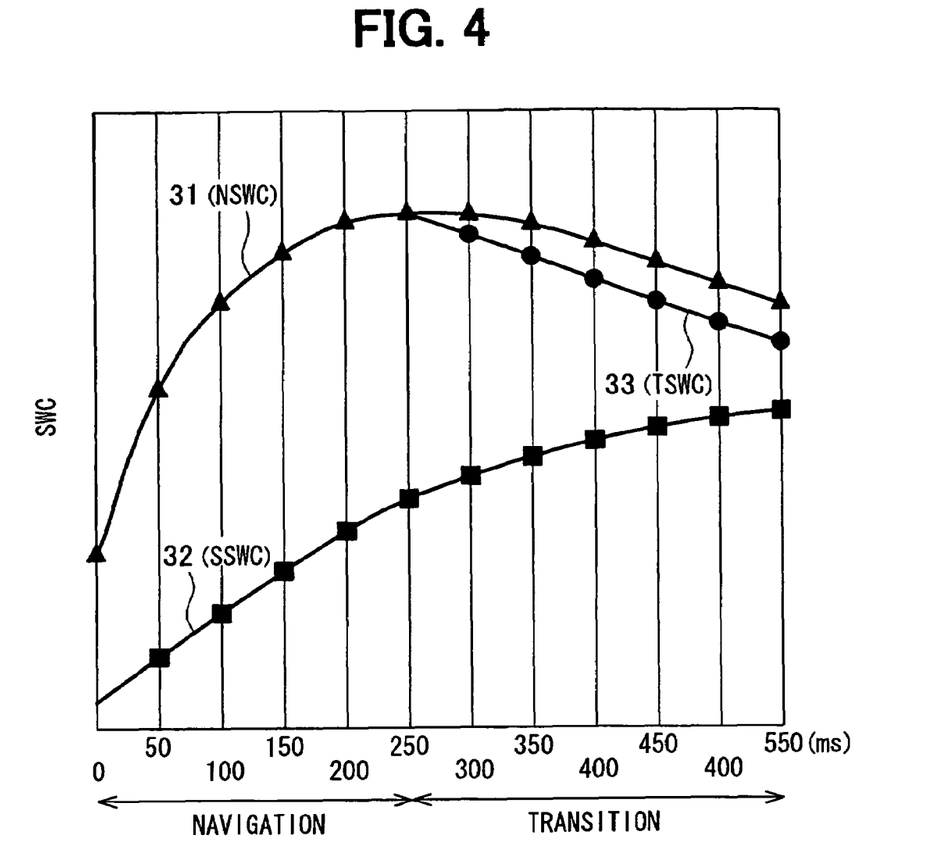
FIG. 4 is a graph showing a change with time of a navigation-based swivel angle, a steering angle swivel angle and a transition swivel angle.

An example of a change with time on each of a navigation-based swivel angle 31, a steering angle swivel angle 32, and a transition swivel angle 33 calculated by the operation of the headlight control apparatus for the vehicle 1 is shown in FIG. 4 under a condition that the swivel angle calculation program 100 is executed every 50 ms. In the navigation-based control period from 0 ms to 250 ms, the navigation-based swivel angle 31 is repeatedly adopted as the control swivel angle SWC. In the transition control period after 250 ms, the transition swivel angle 33 is repeatedly adopted as the control swivel angle SWC.

The transition swivel angle 33 is a value between the previous swivel angle and present steering angle swivel angle 32 in the repetition execution. For example, the transition swivel angle 33 at time 300 ms which is timing immediately after the control period has changed from the navigation-based control period to the transition control period is a value between a value of the navigation-based swivel angle 31 at time 250 ms which is execution timing of the swivel angle calculation program 100 executed previously by one time and the steering-based swivel angle 32 at time 300 ms. In addition, for example, the transition swivel angle 33 at time 400 ms is a value between a value of the navigation-based swivel angle 33 at time 350 ms and the steering-based swivel angle 32 at time 400 ms. In the transition control period, the transition swivel angle is sequentially calculated with such a method and the calculated transition swivel angle is adopted as the control swivel angle SWC. Thereby, the control swivel angle SWC comes gradually closer to the steering angle swivel angle 32. That is, the control swivel angle SWC is determined to change slowly with time.

In this way, at the time of switching from the navigation-based control period to the transition control period, the control swivel angle SWC in the transition control period does not change from the navigation-based swivel angle NSWC to the steering angle swivel angle SSWC immediately, but becomes an intermediate angle therebetween. Therefore, the degree of a change in the control swivel angle SWC is restricted. As a result, the degree of deterioration of forward visibility by a driver is reduced. Further, in the transition control period, a new control swivel angle SWC is sequentially calculated as an angle between the repeatedly calculated steering angle swivel angle SSWC and the previous swivel angle. Therefore, the control swivel angle SWC comes gradually closer to the steering angle swivel angle SSWC.

The transition swivel angle TSWC (step S111) may be calculated in the following manner. As described above, the transition swivel angle TSWC is calculated based upon the previous swivel angle, the steering angle swivel angle SSWC calculated this time at step S104 and an elapse time after the steering is started. In detail, the transition swivel angle TSWC is a weighted average with a transition coefficient K between the previous swivel angle and the steering angle swivel angle SSWC calculated this time in the repetition execution of the swivel angle calculation program 100. That is, when the transition swivel angle TSWC is X, the previous swivel angle is Y and present steering angle swivel angle SSWC is Z, the transition swivel angle TSWC is calculated based on the equation $X=Y-K\times(Y-Z)$. Herein, the transition coefficient K is an increase function of time. However, when an absolute value of $(Y-Z)$ is less than control resolution (for example, 0.1 degrees) of the headlight 10R or 10L, the convergence determination may be the equation $X=Z$.

Figure 5:
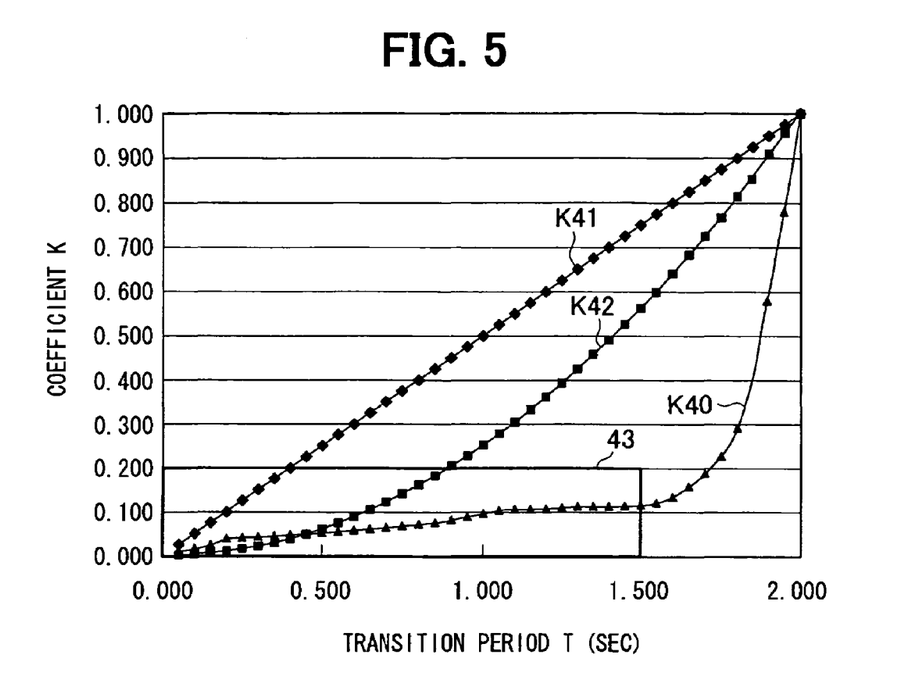
FIG. 5 is a graph showing a change with time of a transition coefficient.
Figure 6:
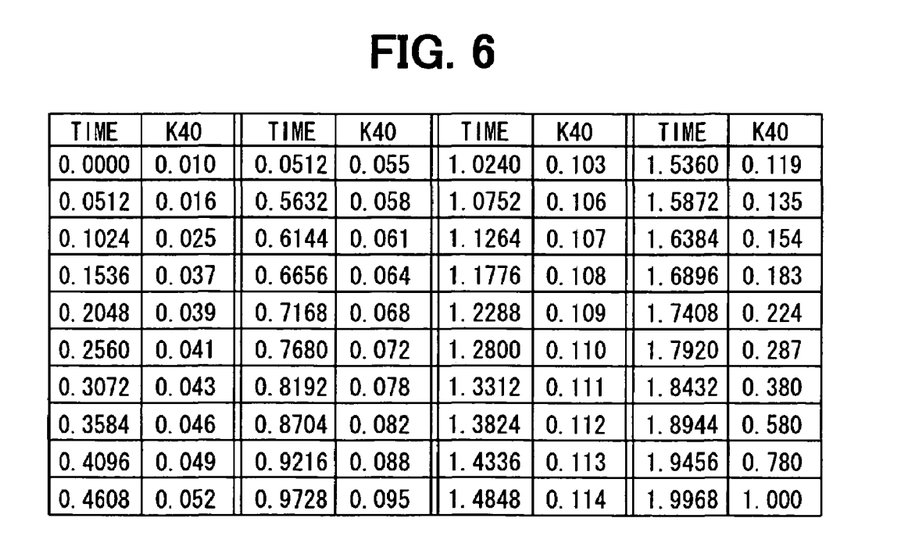
FIG. 6 is a table of a transition coefficient.

FIG. 5 exemplifies a graph showing a change with time of a transition coefficient K used in the embodiment. A value of the transition control period is set as time 0 sec. A value of each of three transition coefficients K40 to K42 exemplified herein is zero in the beginning of the transition control period, monotonically increases in the transition control period and comes to one at the termination of the transition control period (that is, from start of the transition control period to a reference time elapse point explained at step S110). The transition coefficient K41 is a first function of time as $K=T/2$ (t is time), the transition coefficient K42 is a secondary function of time as $K=T^2/4$. In addition, the transition coefficient K40 is always less than the transition coefficient K41 in the transition control period and is smaller than the transition coefficient K42 in almost entire transition control period. A value of the transition coefficient K40 is less than 0.2 in the first 75% of the transition control period as shown in the square 43. The ECU 20 may have a table of a corresponding relation between time T and transition coefficient K40 as shown in FIG. 6, in the ROM 22 or the backup RAM 24 for using the transition coefficient K40.

Since the transition coefficient K is thus an increase function of time, the ECU 20 calculates the transition swivel angle TSWC in such a manner that a ratio of a difference between the previous swivel angle used for calculating the transition swivel angle TSWC to be repeatedly and the steering angle swivel angle used for calculating the transition swivel angle TSWC to the previous swivel angle is sequentially increases. In this way, as compared to a case different from the above case, at the beginning point of the transition control period the control swivel angle SWC slowly changes from the navigation-based swivel angle NSWC and also an effect of speeding up convergence of the control swivel angle SWC on the steering angle swivel angle SSWC is realized. Further, as similar to the transition coefficient K40 and the transition coefficient K42, time differential of the transition coefficient K is a sequential increase function of time, and therefore the above effect further increases.

In addition, as the transition coefficients 40 to 42, at the time of the reference time elapse, the transition coefficient K becomes one and thereby, at the time of the reference time elapse at the latest, the control swivel angle SWC corresponds to the steering angle swivel angle SSWC. Thereby, the convergence of the control swivel angle SWC on the steering angle swivel angle SSWC is promoted.

Figure 7:
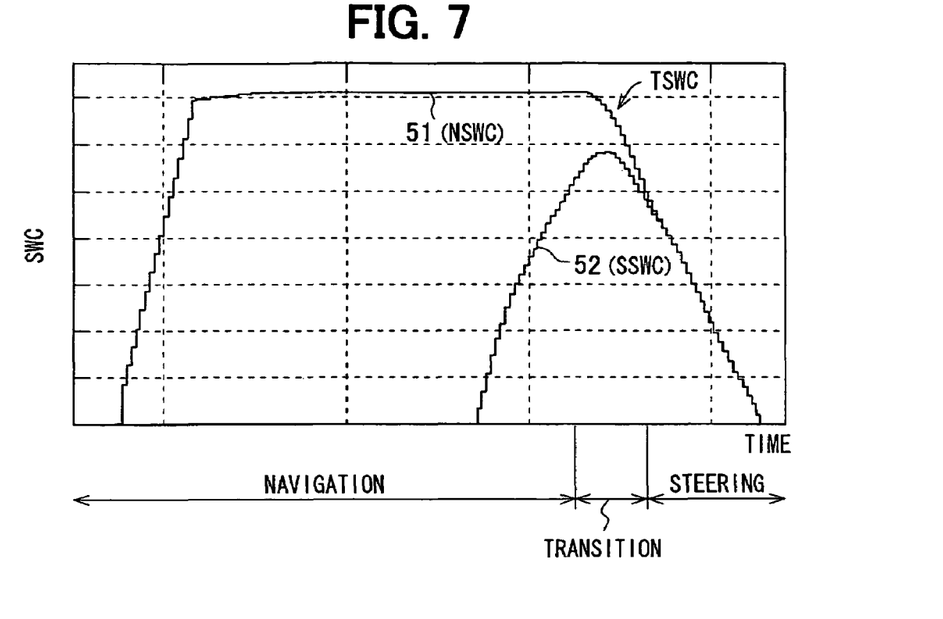
FIG. 7 is a graph showing a change with time of a control swivel angle and a steering angle swivel angle.

An exemplary change in the control swivel angle 51 in the transition control from the navigation-based swivel angle NSWC to the steering angle swivel angle SSWC is shown in FIG. 7. In the beginning point of the transition control period between the navigation-based control period and the steering-based control period, a change in the control swivel angle 51 becomes smooth and in the terminal point of the transition control period, the control swivel angle 51 is shifted smoothly to the steering angle swivel angle 52.

Figure 8:
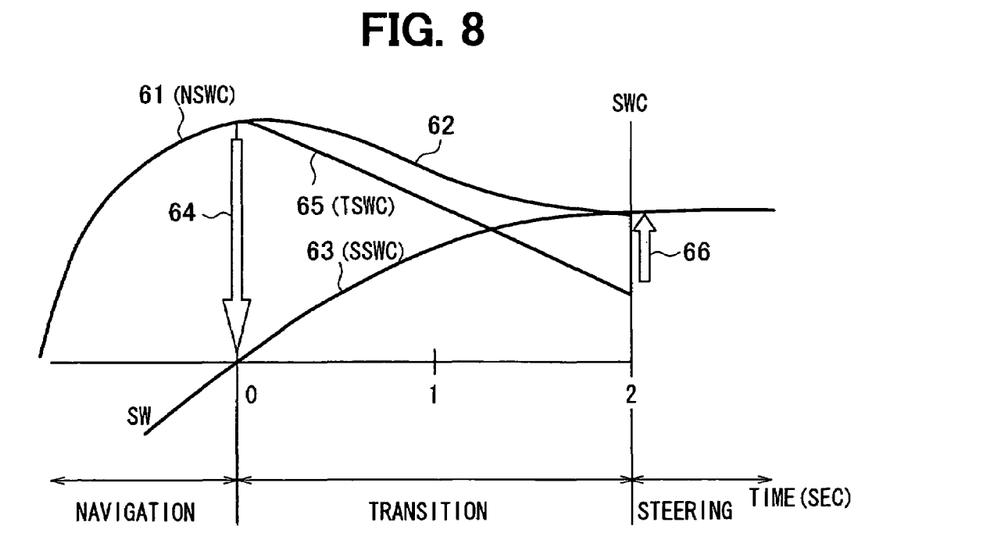
FIG. 8 is a graph showing an effect of a transition swivel angle calculated in the embodiment to a transition swivel angle calculated by an alternative method.

Further, as shown in FIG. 8, the transition swivel angle 62 is connected smoothly to the navigation-based swivel angle 61 and the steering angle swivel angle 63 as described above. On the other hand, if the transition swivel angle 62 is changed directly from the navigation-based swivel angle 61 into the steering angle swivel angle 63 at time zero sec, a sharp decrease of the control swivel angle SWC occurs as shown with an arrow 64. In a case of calculating a transition swivel angle 65 as shown in a line 65, at the terminal point of the transition control period, a sharp increase of the control swivel angle SWC occurs as shown with an arrow 66.

In the above embodiment, each of the right and left actuators 11R and 11L operates as a direction control apparatus. The ECU 20 operates as a direction calculation device. The CPU 21 executes step S105 and step S107 of the swivel control angle calculation program 100 as a first calculation, executes step S104 as a second calculation, and executes step S111 and step S112 as a transition calculation.

The above embodiment may be modified in various ways.

For example, the first method is not limited to the calculation method of the navigation-based swivel angle NSWC. The second method is not limited to the calculation method of the steering angle swivel angle SSWC. Rather, the first method may be the calculation method of the steering angle swivel angle SSWC and the second method may be the calculation method of the navigation-based swivel angle NSWC. In addition, the first method or the second method may be a method in which a two-wheeled vehicle or a pedestrian at the intersection is an irradiation direction. That is, if the first method is different in algorithm or a physical quantity to be used form the second method, the effect of the embodiment is achieved.

Further, it is required only that the headlight control apparatus for the vehicle uses the control direction calculated in the past and the second irradiation direction calculated in the calculation order to repeatedly calculate the transition irradiation direction between the control direction to be used and the second irradiation direction to be used, as the control direction. That is, the control direction calculated in the past is not necessarily required to be the control direction previously calculated, but may be the control direction before the previous control direction or may be an average of a plurality of control directions in the past. The past control direction may be sequentially updated and the second irradiation direction may be sequentially updated. It is required only that the updated directions are used in calculation order in the repetition of calculation of the control direction.

Herein, the calculation order is not necessarily required to be the order made accurately according to the turn calculated. It is sufficient only to show such a tendency that the control direction used for calculation and the second irradiation direction are gradually updated, in view of the entire repetition calculation.

Further, it is not necessarily required that the transition period is limited to a predetermined value. For example, in a state where the transition coefficient K is kept zero or more, the transition control period may continue all the way.

It is required that the transition irradiation direction calculated is a value between the control direction to be used and the second irradiation direction to be used, but it is not necessarily required that the transition irradiation direction calculated is a weighted average of the control direction to be used and the second irradiation direction to be used.

Instead of intermittently and repeatedly calculating the control direction, the first irradiation direction and the second irradiation direction, these directions may be continuously calculated.

Further, it is permitted that the CPU 21 is structured in such a way as not to calculate the navigation-based swivel angle NSWC at step S104 of the program 100.

Furthermore, the foregoing embodiment and modifications are provided for illustration only, and not for the purpose of limiting the invention.

What is claimed is:

1. A headlight control apparatus for a vehicle having a headlight, the headlight control apparatus comprising:
    a direction control device for controlling an irradiation direction of the headlight; and
    a direction calculation device for calculating a control direction in which the headlight is controlled to irradiate a beam,
    wherein the direction calculation device includes:
        a first calculation section which calculates a first irradiation direction as the control direction with a first method in a first period;
        a second calculation section which calculates a second irradiation direction with a second method different from the first method; and
        a transition calculation section which, in a transition control period subsequent to the first period, uses the control direction calculated in the past and the second irradiation direction calculated by the second calculation section for calculating a transition irradiation direction between the control direction and the second irradiation direction to be used as the control direction so that the control direction to be used can be gradually changed to the second irradiation direction.

2. The headlight control apparatus according to claim 1, wherein the transition calculation section calculates, in the transition control period, the transition irradiation direction so that a ratio of a difference between the control direction for the transition irradiation direction calculated and the second irradiation direction to be used for the transition irradiation direction to the control direction is sequentially increased.

3. The headlight control apparatus according to claim 2, wherein the transition calculation section calculates, in the transition control period, the transition irradiation direction so that a speed in which the ratio is sequentially increased is sequentially increased.

4. The headlight control apparatus according to claim 1 wherein the transition calculation section calculates the transition irradiation direction in such a manner that the transition irradiation direction becomes a value equal to the used second irradiation direction within a reference period from start of the transition control period.

5. The headlight control apparatus according to claim 1, wherein the transition calculation section calculates the transition irradiation direction as a weighted average of the used control direction and the used second irradiation direction.

6. The headlight control apparatus according to claim 1, wherein the first calculation section uses one of a forward road shape and a steering angle to calculate the first irradiation direction, and the second calculation section uses the other of a forward road shape and a steering angle to calculate the second irradiation direction.

7. A headlight control method for a vehicle having a headlight, the headlight control method comprising:
    detecting a travel condition of the vehicle;

determining a headlight control mode based on the detected travel condition;

calculating a first irradiation direction of the headlight with a first method and a second irradiation direction of the headlight with a second method, when the headlight control mode is determined to be a first mode and a second mode, respectively, so that the headlight is controlled to irradiate a beam in the calculated direction; and gradually changing an irradiation direction from the first irradiation direction to the second irradiation direction when the headlight control mode is determined to be a transition mode between the first mode to the second mode.

8. The headlight control method according to claim 7, wherein the first irradiation direction is calculated based on one of a forward road shape and a steering angle, and the second irradiation direction is calculated based on the other of a forward road shape and a steering angle.

9. The headlight control method according to claim 7, wherein said gradually changing the irradiation direction from the first irradiation direction to the second irradiation direction when the headlight control mode is determined to be the transition mode includes calculating a transition irradiation direction based on the first irradiation direction and the second irradiation direction, the transition irradiation direction being between the first irradiation direction and the second irradiation direction.

10. The headlight control method according to claim 7, wherein the first irradiation direction is calculated with the first method for a first point in time and the second irradiation direction is calculated with the second method for a second point in time which is later than the first point in time.

11. The headlight control apparatus according to claim 1, wherein the control direction calculated in the past is calculated by the first calculation section with the first method.

12. The headlight control apparatus according to claim 1, wherein the second irradiation direction is calculated for a time after a time for which the used control direction calculated in the past is calculated.

* * * * *